(12) United States Patent
Barber et al.

(10) Patent No.: US 10,082,902 B1
(45) Date of Patent: Sep. 25, 2018

(54) DISPLAY CHANGES VIA DISCRETE MULTI-TOUCH GESTURES

(71) Applicant: Rockwell Collins, Inc., Cedar Rapids, IA (US)

(72) Inventors: Sarah Barber, Cedar Rapids, IA (US); Bryan C. Schultz, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 196 days.

(21) Appl. No.: 15/204,383

(22) Filed: Jul. 7, 2016

(51) Int. Cl.
*G06F 3/041* (2006.01)
*G06F 3/0488* (2013.01)
*B64D 43/00* (2006.01)

(52) U.S. Cl.
CPC .......... *G06F 3/0416* (2013.01); *B64D 43/00* (2013.01); *G06F 3/0412* (2013.01); *G06F 3/04883* (2013.01); *G06F 2203/04104* (2013.01); *G06F 2203/04808* (2013.01)

(58) Field of Classification Search
CPC .. G06F 3/0416; G06F 3/04883; G06F 3/0412; G06F 2203/04808; G06F 2203/04104; B64D 43/00
See application file for complete search history.

(56) References Cited

U.S. PATENT DOCUMENTS

| | | | |
|---|---|---|---|
| 2012/0229391 A1* | 9/2012 | Skinner | G06F 3/04883 345/173 |
| 2015/0346893 A1* | 12/2015 | Schevin | G06F 3/0488 345/174 |

* cited by examiner

*Primary Examiner* — Jonathan Boyd
(74) *Attorney, Agent, or Firm* — Angel N. Gerdzhikov; Donna P. Suchy; Daniel M. Barbieri

(57) ABSTRACT

A touch screen controller identifies a multi-touch gesture associated with a display feature such as scale or orientation. The touch screen controller applies a discrete value change to the display feature from an ordered set of discrete values. The number of points of contact in the multi-touch gesture may be interpreted by the touch screen controller as step changes in the ordered set of discrete values when applying the value change to the display feature.

18 Claims, 4 Drawing Sheets

DISPLAY CHANGES VIA DISCRETE MULTI-TOUCH GESTURES

BACKGROUND

Multi-touch gesture inputs provide an intuitive and efficient user interface for many functions and applications in avionics systems. However, traditional "analog" or finely adjustable multi-touch gestures cannot adequately replace certain input commands where there is a required step-change. For example, map ranges are defined by a set of discrete values selectable by the pilot. These are typically in the order of 2, 5, 10, 20, 50, 100, 200, 500, 1000 miles and are commonly input via knob clicks. Likewise, map orientation can be set to either heading up, track up or North up. These selections are typically input via button selection.

In both cases, an analog multi-touch input does not substitute for the "digital" or highly constrained nature of the existing control scheme. Allowing a continuous map range selection or map orientation selection is incompatible with existing avionics systems.

It would be advantageous to have a touch screen controller and display system that interpreted multi-touch inputs within the constraints of highly constrained, acceptable input values.

SUMMARY

In one aspect, embodiments of the inventive concepts disclosed herein are directed to a touch screen controller that identifies a multi-touch gesture associated with a display feature such as scale or orientation. The touch screen controller applies a discrete value change to the display feature from an ordered set of discrete values. In some embodiments, the touch screen controller is incorporated into an avionics system.

In a further aspect, the number of points of contact in the multi-touch gesture are interpreted by the touch screen controller as step changes in the ordered set of discrete values when applying the value change to the display feature.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
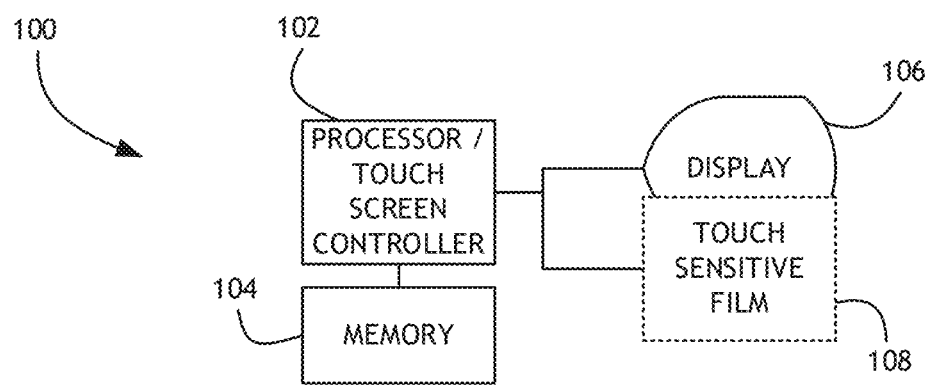
FIG. 1 shows a computer system according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a multi-touch gesture recognition system for use in avionics applications that resolves multi-touch gestures into discrete value changes based on a type of user interface being manipulated.

Figure 2:
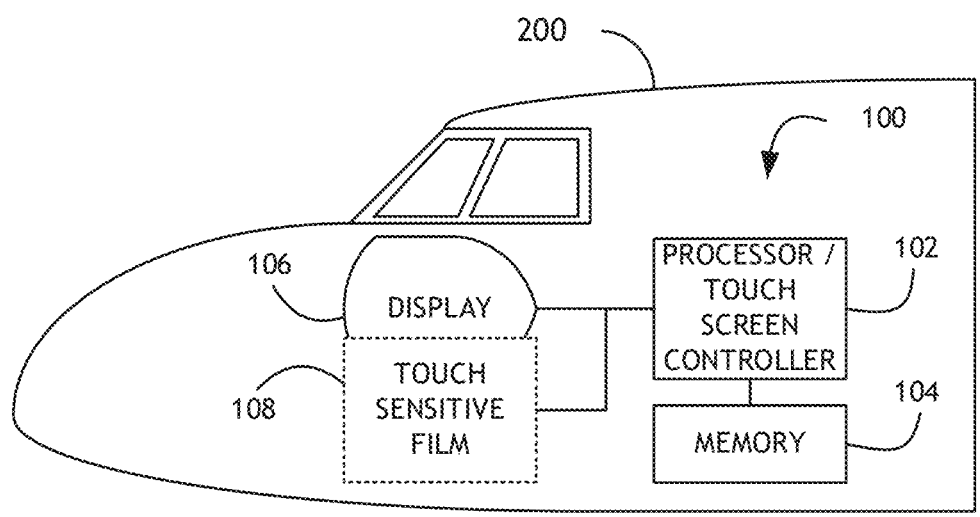
FIG. 2 shows a block diagram of an aircraft cockpit including a computer system as in FIG. 1.

Referring to FIGS. 1 and 2, a computer system 100 according to an exemplary embodiment of the inventive concepts disclosed herein, and a cockpit 200 including such computer system 100 are shown. The system 100 includes a processor 102, memory 104 connected to the processor 102 for embodying processor executable code, and a display 106 and touch sensitive film and digitizer 108 connected to the processor for receiving gesture based inputs.

In at least one embodiment, the processor 102 receives a set of discrete, acceptable values for one or more aspects of a display 106 as defined by a corresponding software application being displayed. For example, a map system in an avionics environment may utilize a range setting from a set of discrete values such as 2, 5, 10, 20, 50, 100, 200, 500, and 1000 miles. Intermediate range settings are unacceptable to the map system. The processor 102 is configured to identify a type of multi-touch input gesture resolvable by the touch sensitive film and digitizer 108, and associate the type of multi-touch input gesture with the set of discrete values. The processor 102 defines a minimum threshold value of multi-touch input to trigger a transition between discrete values in the set of discrete values. In at least one embodiment, any multi-touch input gesture of greater magnitude than the minimum threshold value triggers a single transition event.

In at least one embodiment, the processor 102 defines a step threshold value in addition to the minimum threshold value. The step threshold value defines a magnitude of a multi-touch input for the same type of multi-touch input to trigger a second transition step in the set of discrete values.

In at least one embodiment, the processor 102 associates different types of multi-touch input gestures with a multiple step transition in the set of discrete values. For example, a multi-touch pinch gesture using two fingers may trigger a single step transition while a multi-touch pinch gesture using three fingers may trigger a two-step transition.

Figure 3:
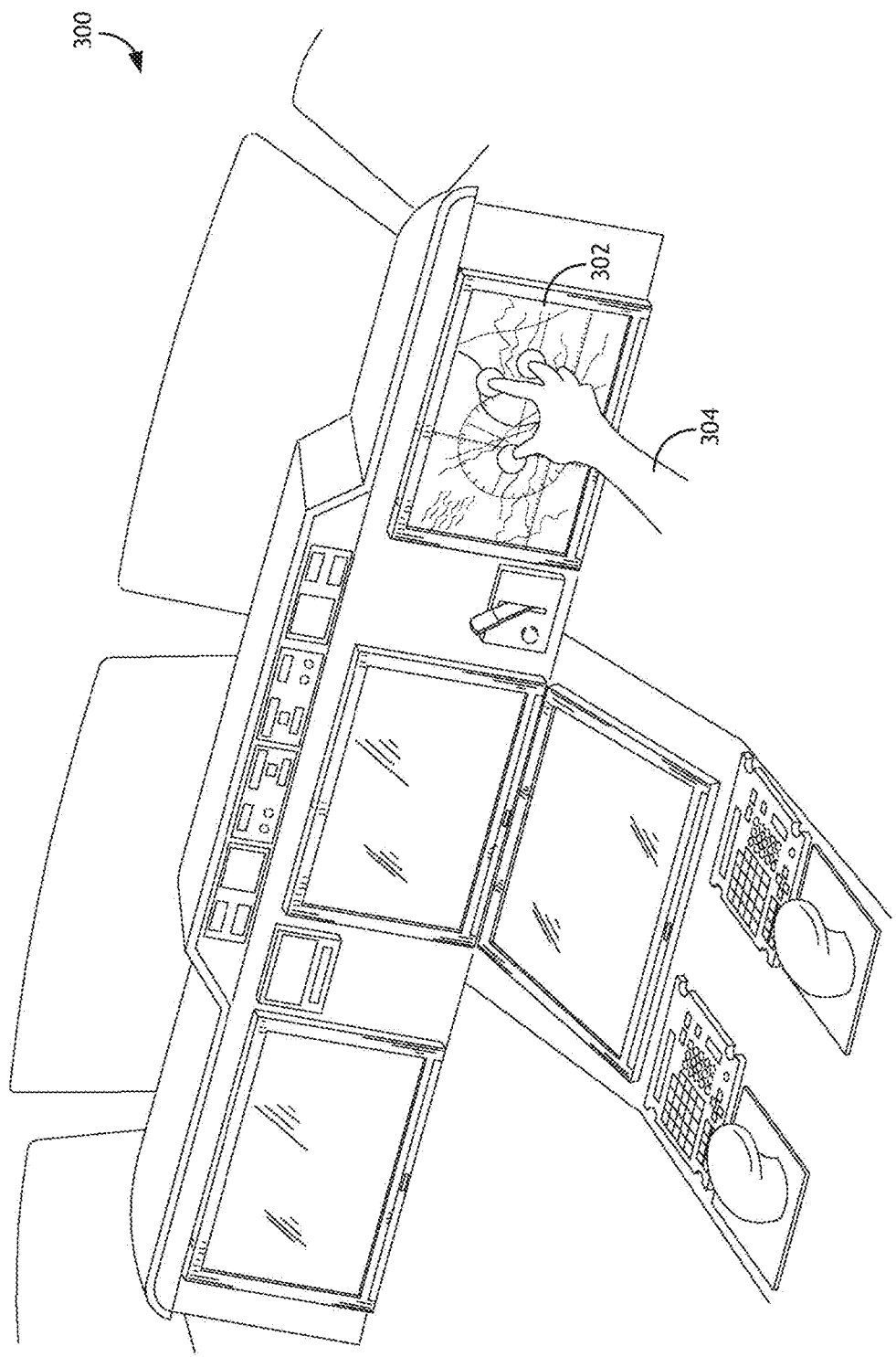
FIG. 3 shows a perspective environmental view of a cockpit with an avionics display receiving a multi-touch input according to embodiments of the inventive concepts disclosed herein.

Referring to FIG. 3, a perspective environmental view of a cockpit 300 with an avionics display 302 receiving a multi-touch input 304 according to embodiments of the inventive concepts disclosed herein is shown. Some avionics applications, such as maps and radar displays, are configured to only display in certain scales and certain orientations. Furthermore, pilots are trained to quickly understand information displayed by those applications at those scales and orientations, so systems configured to display information in a more analog or infinitely adjustable way are undesirable and in some cases may violate avionics system certification requirements. Systems according to the inventive concepts described herein allow a user to trigger a single transition between discrete levels in an avionics system display with a single multi-touch gesture of any magnitude above a certain threshold. The user can thereby reliably switch between known settings without focusing on the multi-touch input.

Figure 4:
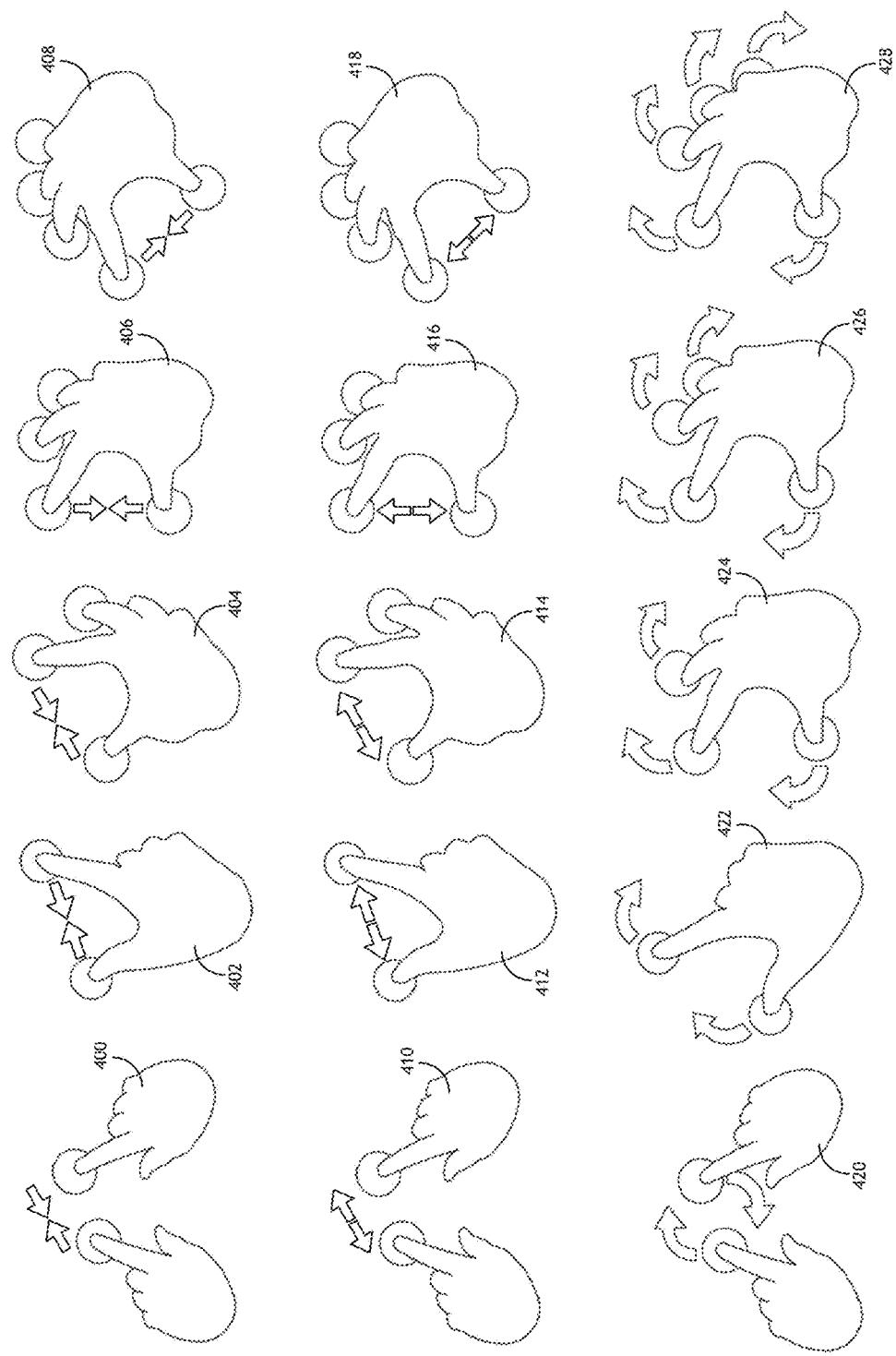
FIG. 4 shows representations of multi-touch gestures interpreted by computer systems according to embodiments of the inventive concepts disclosed herein.

Referring to FIG. 4, representations of multi-touch gestures 400, 402, 404, 406, 408, 410, 412, 414, 416, 418, 420, 422, 424, 426, 428 interpreted by computer systems according to embodiments of the inventive concepts disclosed herein are shown. Multi-touch gestures may include, but are not limited to, pinch gestures such as two-finger pinch 400, 402, three-finger pinch 404, four-finger pinch 406, and five-finger pinch 408; expand gestures such as two-finger expand 410, 412, three-finger expand 414, four-finger expand 416, and five-finger expand 418; and rotate gestures such as two-finger rotate 420, 422, three-finger rotate 424, four-finger rotate 426, and five-finger rotate 428. Multi-touch gestures 400, 402, 404, 406, 408, 410, 412, 414, 416, 418, 420, 422, 424, 426, 428 may be differentiated by type where different types of multi-touch gestures 400, 402, 404, 406, 408, 410, 412, 414, 416, 418, 420, 422, 424, 426, 428 elicit different responses from a system. For example, a map application or chart application in an avionics system with a touch sensitive display may interpret pinch type gestures 400, 402, 404, 406, 408 and expand type gestures 410, 412, 414, 416, 418 to change the scale of the displayed map or chart while also interpreting rotate type gestures 420, 422, 424, 426, 428 to change the orientation of the displayed map or chart.

In some embodiments, a computer system interprets each pinch type gesture 400, 402, 404, 406, 408 as triggering a single step change to increase the map scale, regardless of the magnitude of the pinch type gesture 400, 402, 404, 406, 408. Similarly, each expand type gesture 410, 412, 414, 416, 418 is interpreted as triggering a single step change to decrease the map scale. Alternatively, pinch type gestures 400, 402, 404, 406, 408 may be interpreted to "throw in" levels of detail from, for example, a map, while expand type gestures 410, 412, 414, 416, 418 "pull out" levels of detail. Various levels of declutter are thereby easily stepped through.

In some embodiments, pinch type gestures 400, 402, 404, 406, 408 and expand type gestures 410, 412, 414, 416, 418 control the size of a multifunction window. When a single physical display shows several application windows filing less than all of the physical display, expand type gestures 410, 412, 414, 416, 418 are interpreted to enlarge an application window corresponding to the expand type gesture 410, 412, 414, 416, 418 to fill the entire display space. Similarly, when an application window fills the full display space, pinch type gestures 400, 402, 404, 406, 408 are interpreted to shrink the application window corresponding to the pinch type gesture 400, 402, 404, 406, 408 to one-half, and potentially further to one-quarter of the display space, or reduce the application window to a previous size.

Likewise, the computer system interprets each rotate type gesture 420, 422, 424, 426, 428 as triggering a single step change in orientation (a change in orientation by a predefined angle, such as 90°), regardless of the magnitude of the rotate type gesture 411, 422, 424, 426, 428. Alternatively, each rotate type gesture 411, 422, 424, 426, 428 steps through a map orientation cycle (e.g. Heading, Track, North). Movement through the cycle depends on the directionality of the rotate type gesture 411, 422, 424, 426, 428.

In some embodiments, the computer system interprets pinch type gestures 400, 402, 404, 406, 408 and expand type gestures 410, 412, 414, 416, 418 based on the number of points of contact as triggering step changes in scale, the number of step changes corresponding to the number of points of contact. For example, a two-finger pinch gesture 400, 402 or two finger expand gestures 410, 412 may trigger a single step change, a three-finger pinch gesture 404 or three finger expand gesture 414 may trigger a two-step change, a four-finger pinch gesture 406 or four finger expand gesture 416 may trigger a three-step change, and a five-finger pinch gesture 408 or five finger expand gesture 418 may trigger a four-step change. Likewise, the computer system interprets rotate type gestures 420, 422, 424, 426, 428 based on the number of points of contact as triggering step changes in orientation, the number of step changes corresponding to the number of points of contact. For example, a two-finger rotate gesture 420, 422 may trigger a single step change (for example, 45°, or a cycle of available orientations), a three-finger rotate gesture 424 may trigger a two-step change (for example, 90°, or two cycles of available orientations), a four-finger rotate gesture 426 may trigger a three-step change, and a five-finger rotate gesture 428 may trigger a four-step change.

While the examples shown illustrate pinch, expand, and rotate type gestures 400, 402, 404, 406, 408, 410, 412, 414, 416, 418, 420, 422, 424, 426, 428, any multi-touch gesture that makes use of two or more fingers could have a "digital" or magnitude independent equivalent.

Figure 5:
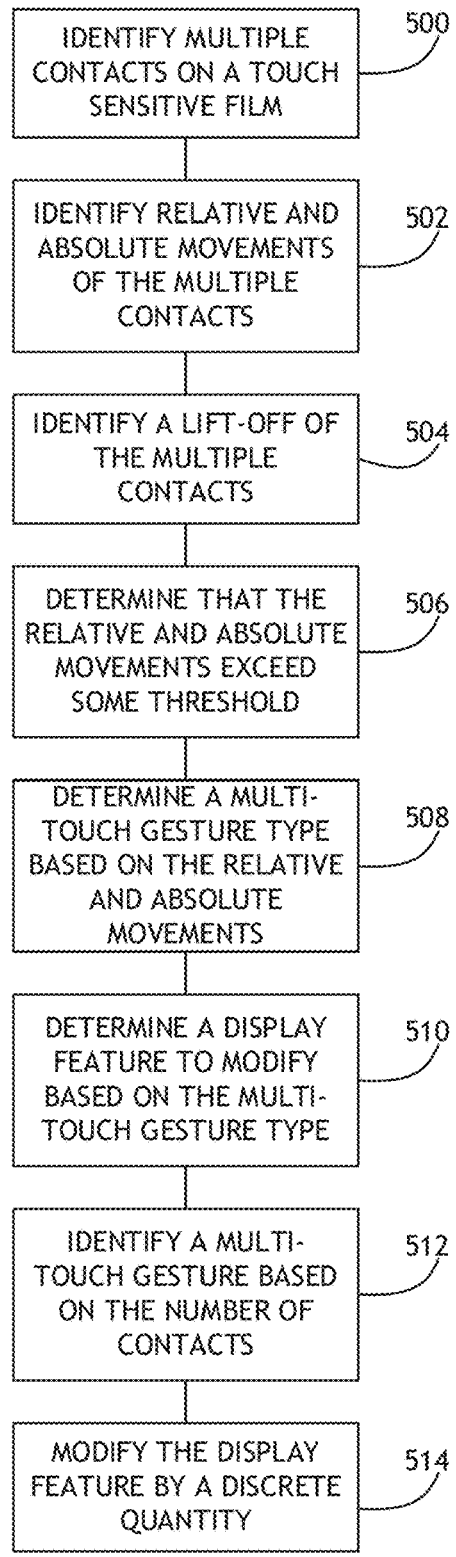
FIG. 5 shows a flowchart of a method for defining and implementing discrete gesture inputs.

Referring to FIG. 5, a flowchart of a method for defining and implementing discrete gesture inputs is shown. In some embodiments, a touch screen controller in an avionics system identifies 500 a multiple contact event on a touch sensitive film, and identifies 502 relative and absolute movements of the multiple contacts on the touch sensitive film concluded by identifying 504 a lift-off of the multiple contacts from the touch sensitive film. The touch screen controller then determines 506 that the relative and absolute movements exceed some minimum threshold.

Based on the identified 502 relative and absolute movements, the touch screen controller determines 508 the multi-touch gesture type (for example: pinch, expand, rotate, or swipe).

Each multi-touch gesture type may be associated with a display feature such as scale, detail level, orientation, or application window size. Each display feature is associated with an ordered set of discrete, acceptable values corresponding to the display feature. The touch screen controller determines 510 the display feature associated with the determined 508 gesture type and modifies 514 the display feature by transitioning the display feature to the next or previous discrete value in the ordered set based on the nature of the multi-touch gesture (pinch or expand, rotate left or right, etc.)

In some embodiments, the touch screen controller identifies 512 the number of contacts in the multi-touch gesture. The number of contacts may be used to identify a number of step changes in the set of discrete values when the touch screen controller modifies 514 the display value.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A multi-touch enabled display system comprising:
   a processor;
   a display connected to the processor;
   a multi-touch sensitive film in data communication with the processor;
   memory connected to the processor for embodying processor executable code; and
   processor executable code to configure the processor to:
     identify a number of points of contact on the multi-touch sensitive film,
     identify relative and absolute movements of two or more contacts;
     identify a lift-off event of the two or more contacts;
     determine that the relative and absolute movements exceed a minimum threshold of magnitude;
     determine a multi-touch gesture type based on the relative and absolute movements;
     determine a display feature based on the multi-touch gesture type;
     determine a number of step changes in an ordered set of acceptable values based on the number of points of contact, and
     modify the display feature by applying the number of step changes from the ordered set of acceptable values.

2. The multi-touch enabled display system of claim 1, wherein:
   the display feature comprises a range setting; and
   the multi-touch gesture comprises one of a pinch type gesture or an expand type gesture.

3. The multi-touch enabled display system of claim 1, wherein:
   the display feature comprises a detail setting; and
   the multi-touch gesture comprises one of a pinch type gesture or an expand type gesture.

4. The multi-touch enabled display system of claim 1, wherein:
   the display feature comprises an application window size;
   the order set of acceptable values comprises a predefined set of window sizes; and
   the multi-touch gesture comprises one of a pinch type gesture or an expand type gesture.

5. The multi-touch enabled display system of claim 1, wherein:
   the display feature comprises a map orientation setting; and
   the multi-touch gesture comprises a rotate gesture.

6. The multi-touch enabled display system of claim 5, wherein the ordered set of acceptable values comprises a north orientation, a track orientation, and a heading orientation.

7. The multi-touch enabled display system of claim 5, wherein the ordered set of acceptable values comprises a plurality of angle values.

8. An aircraft having a multi-touch enabled display system comprising:
   a processor;
   a display connected to the processor;
   a multi-touch sensitive film connected to the processor;
   memory connected to the processor for embodying processor executable code; and
   processor executable code to configure the processor to:
     identify a number of points of contact on the multi-touch sensitive film;
     identify relative and absolute movements of two or more contacts;
     identify a lift-off event of the two or more contacts;
     determine that the relative and absolute movements exceed a minimum threshold of magnitude;
     determine a multi-touch gesture type based on the relative and absolute movements;
     determine a display feature based on the multi-touch gesture type;
     determine a number of step changes in an ordered set of acceptable values based on the number of points of contact, and
     modify the display feature by applying the number of step changes from the ordered set of acceptable values.

9. The aircraft of claim 8, wherein:
   the display feature comprises a range setting; and the multi-touch gesture comprises one of a pinch type gesture or an expand type gesture.

10. The aircraft of claim 8, wherein:
the display feature comprises a detail setting; and
the multi-touch gesture comprises one of a pinch type gesture or an expand type gesture.

11. The aircraft of claim 8, wherein:
the display feature comprises an application window size;
the order set of acceptable values comprises a predefined set of window sizes; and
the multi-touch gesture comprises one of a pinch type gesture or an expand type gesture.

12. The aircraft of claim 8, wherein:
the display feature comprises a map orientation setting; and
the multi-touch gesture comprises a rotate gesture.

13. The aircraft of claim 12, wherein the ordered set of acceptable values comprises a north orientation, a track orientation, and a heading orientation.

14. The aircraft of claim 12, wherein the ordered set of acceptable values comprises a plurality of angle values.

15. A method for modifying a display feature in a multi-touch sensitive display by a discrete quantity comprising:
identifying a number of points of contact on the multi-touch sensitive film;
identifying relative and absolute movements of the two or more contacts;
identifying a lift-off event of the two or more contacts;
determining that the relative and absolute movements exceed a minimum threshold of magnitude;
determining a multi-touch gesture type based on the relative and absolute movements;
determining a number of step changes in an ordered set of acceptable values based on the number of points of contact, and
modifying the display feature by applying the number of step changes from the ordered set of acceptable values.

16. The method of claim 15, wherein the display feature comprises a map orientation setting and the ordered set of acceptable values comprises a north orientation, a track orientation, and a heading orientation.

17. The method of claim 15, wherein the display feature comprises a range setting.

18. The method of claim 15, wherein the display feature comprises a detail setting.

\* \* \* \* \*